United States Patent
Kaplanis et al.

(10) Patent No.: US 11,687,309 B2
(45) Date of Patent: Jun. 27, 2023

(54) GEOSPATIAL DISPLAY CONFIGURATION

(71) Applicant: Hewlett-Packard Development Company, L.P., Spring, TX (US)

(72) Inventors: Anthony Kaplanis, Spring, TX (US); Alexander Williams, Spring, TX (US); Syed Azam, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/616,005

(22) PCT Filed: Sep. 26, 2019

(86) PCT No.: PCT/US2019/053247
§ 371 (c)(1),
(2) Date: Dec. 2, 2021

(87) PCT Pub. No.: WO2021/061134
PCT Pub. Date: Apr. 1, 2021

(65) Prior Publication Data
US 2022/0317963 A1 Oct. 6, 2022

(51) Int. Cl.
*G06F 3/038* (2013.01)
*G06F 3/14* (2006.01)
*G06T 7/73* (2017.01)

(52) U.S. Cl.
CPC ............ *G06F 3/1423* (2013.01); *G06F 3/038* (2013.01); *G06T 7/75* (2017.01); *G06T 2207/10016* (2013.01); *G06T 2207/30204* (2013.01)

(58) Field of Classification Search
CPC ...... G06F 3/038; G06F 3/0481; G06F 3/1423; G06F 3/1446; G06T 2207/10016; G06T 2207/30204; G06T 7/75; G09G 2340/0464; G09G 2356/00; G09G 5/32
See application file for complete search history.

(56) References Cited

U.S. PATENT DOCUMENTS

| | | |
|---|---|---|
| 8,407,347 B2 | 3/2013 | Zhang et al. |
| 8,988,343 B2 | 3/2015 | Fei et al. |
| 9,286,025 B2 | 3/2016 | Jain et al. |
| 9,325,378 B2 | 4/2016 | Kee |
| 9,531,999 B2 | 12/2016 | Shi et al. |
| 9,588,654 B2 | 3/2017 | Satow et al. |

(Continued)

*Primary Examiner* — Insa Sadio
(74) *Attorney, Agent, or Firm* — Quarles & Brady LLP

(57) ABSTRACT

In an example implementation according to aspects of the present disclosure, a system comprising a camera, a plurality of displays and a processor. The processor receives a series of images, from the camera, corresponding to a physical environment, wherein the series of images include the plurality of displays. The processor identifies a fiducial mark within the series of images corresponding to a display. The processor determines a three-dimensional space based on a camera position based on the series of images. The processor determines a location within the three-dimensional space corresponding to the one of the plurality of displays. The processor creates a geospatial relationship between the location and the camera within the three-dimensional space. The processor correlates the geospatial relationship to a display configuration screen. The processor creates a pointing device path in the display configuration screen corresponding to the geospatial relationship.

15 Claims, 4 Drawing Sheets

(56) References Cited

U.S. PATENT DOCUMENTS

| | | |
|---|---|---|
| 10,157,032 B2 | 12/2018 | Neisler et al. |
| 2009/0070065 A1* | 3/2009 | Seko .................... G01B 11/002 |
| | | 702/152 |
| 2017/0249745 A1* | 8/2017 | Fiala ....................... A63F 13/65 |

* cited by examiner

GEOSPATIAL DISPLAY CONFIGURATION

BACKGROUND

Computing devices including personal computers often utilize multiple display systems for conveying a desktop workspace. The desktop workspace provides an interface to allow a user to open and manipulate applications to accomplish tasks.

DETAILED DESCRIPTION

Computers often utilize multiple displays to visualize data and present data to the user. Configurations may range from homogenous displays mounted in close precise proximity to heterogenous displays of different sizes, display technologies, and display locations. In the latter, configuration of a virtual workspace or "desktop" may be difficult as the location and configuration of the display may be unknown to the computer's operating system or configuration utility. As described herein is a geospatial display configuration. The system presents fiducial marks on each of the screens uniquely identifying each of the displays. The system utilizes a camera to capture images a set of images of the room including all the displays and fiducial marks around the computer system. The system analyzes the images to create a three-dimensional model of the room and creates a geospatial relationship between the displays. The system then applies the geospatial relationship to a display configuration screen so a proper mouse path can be identified across all.

In one example, a system including a camera, a plurality of displays and a processor receive a series of images corresponding to the physical environment around the system. The system identifies fiducial marks within the series of images. The system determines a three-dimensional space based on a camera position determined from the series of images. The system determines a location within the three-dimensional space corresponding to one of the displays. The system creates a geospatial relationship between the location and the camera within the three-dimensional space. The system correlates the geospatial relationship to a display configuration screen and creates a pointing device path in the configuration screen.

Figure 1:
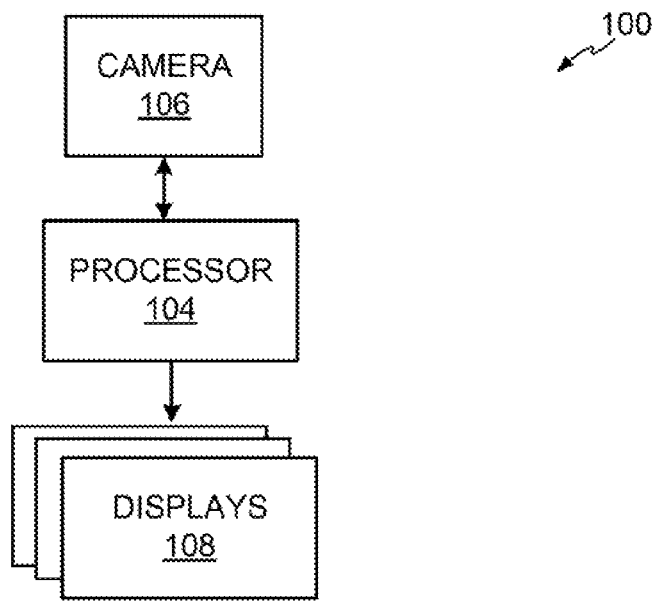
FIG. 1 is a block diagram illustrating a system for geospatial display configuration, according to an example.

FIG. 1 is a block diagram 100 illustrating a system for geospatial display configuration, according to an example. The system for geospatial display configuration may include a number of displays 108, a camera 106, and a processor 104.

The displays 108 may include any number of displays attached to the processor and in a powered and enabled state in one implementation, the displays 108 may be homogenous. In another implementation the displays 108 may differ in size, shape, and interface connection. The displays 108 may be implemented in various display technologies such as light emitting diode (LED), organic light emitting diode (OLED), projection, and cathode ray tube to name a few implementations. The displays 108 may be communicatively coupled to the processor 104 via a number of display interfaces. Display connection interfaces may include but are not limited to high definition multimedia interface (HDMI), DisplayPort, and digital video interface (DVI). In one implementation, one or more displays may be integrated into a common device as the processor 104. The displays 108 may be communicatively coupled to the processor 104 using suitable interfaces such as but not limited to low voltage differential signaling (LVDS). In another implementation, the displays 108 may be wirelessly connected to the processor 104 via a communication protocol such as Miracast.

The displays 108 may be physically located in a common space. The orientation of the displays may not be uniform or symmetrical. The displays 108 may be arranged in a way where one or more viewers have appropriate views from different physical positions in relation to the displays. The displays 108 may be configured to display data sent from the processor 104 including presentation information, fiducial marks, and user interface pointing device elements.

A camera 106 may be communicatively coupled to the processor 104. The camera 106 may be a digital camera utilizing a charge-coupled device (CCD) image sensor to digitally capture images of the physical environment. The camera 106 may be integrated into the same device as the processor 104. In one implementation the camera 106 may be a webcam implementation in a laptop computing device. In another implementation, the camera 106 may be a standalone camera coupled through a communication interface, such as universal serial bus (USB), to a computing device.

The processor 104 may be utilized for controlling image capturing and display identification for geospatial display configuration. The processor 104 may be configured to receive a series of images from the camera. The images may correspond to the physical environment, including items ancillary to the displays 108. The images may also include the displays 108. The processor 104 may present on each of the displays 108 a fiducial mark. The fiducial mark may be an electronic machine readable whereby the processor 104 may identify the display on which it appears. One implementation of the fiducial mark may be a quick response (QR) code. Another implementation of the fiducial mark may be a universal product code (UPC) or bar code. The fiducial mark may be implemented by various imaging technologies however the resulting mark may uniquely identify the display connected to the processor 104.

The processor 104 may be configured to determine a three-dimensional space based on the camera position and the series of images. This process is called photogrammetry. Photogrammetry utilizes the identification of common points within a series of images to determining a location of the capturing camera, and additionally triangulate a relational three-dimensional space. Utilizing a large series of images results in a more precise three-dimensional space, and therefore a more precise three-dimensional model. The processor 104 may be configured to determine a location with in the three-dimensional space corresponding to the displays 108. The processor 104 may utilize the fiducial mark to identify the display from the series of images. The fiducial mark may be machine readable and therefore should be able to process and identify the display.

The processor 104 may be configured to the determine a location within the three-dimensional space of the display and create a geospatial relationship between the location corresponding to display and the camera within the three-dimensional space. The processor 104 may translate relative locations between the identified camera position and locations of the identified fiducial marks. The camera position may be represented as a cartesian triplet; identifying the x, y, and z position of the camera in the three-dimensional model. The fiducial mark corresponding to the display may have a corresponding cartesian triplet locating it in the three-dimensional model. The processor 104 may calculate a difference between the cartesian triplet to create a geospatial relationship. In systems where more than one display is associated with a unique fiducial mark, the processor 104 may calculate the difference from one display to the next, thereby creating additional geospatial relationships between displays. Likewise, the processor may calculate the difference from each of the other displays 108 and the camera position.

The processor 104 may be configured to correlate the geospatial relationships to a display configuration screen. In one implementation, the processor 104 provides an imprecise representation of the geospatial relationship, indicating a general directional relationship to each other. For example, the configuration screen may display three displays, not representative and not to scale of the actual three-dimensional space or three-dimensional model, but instead an uncomplicated illustration displaying the geospatial relationships of the displays to one another. In another implementation, the full three-dimensional model may be displayed.

The processor 104 may be configured to create a pointing device path in the display configuration screen. As described above, the geospatial relationship determines the relative locations of the display. The processor may determine a mouse path across the all the displays as an extended desktop.

Figure 2A:
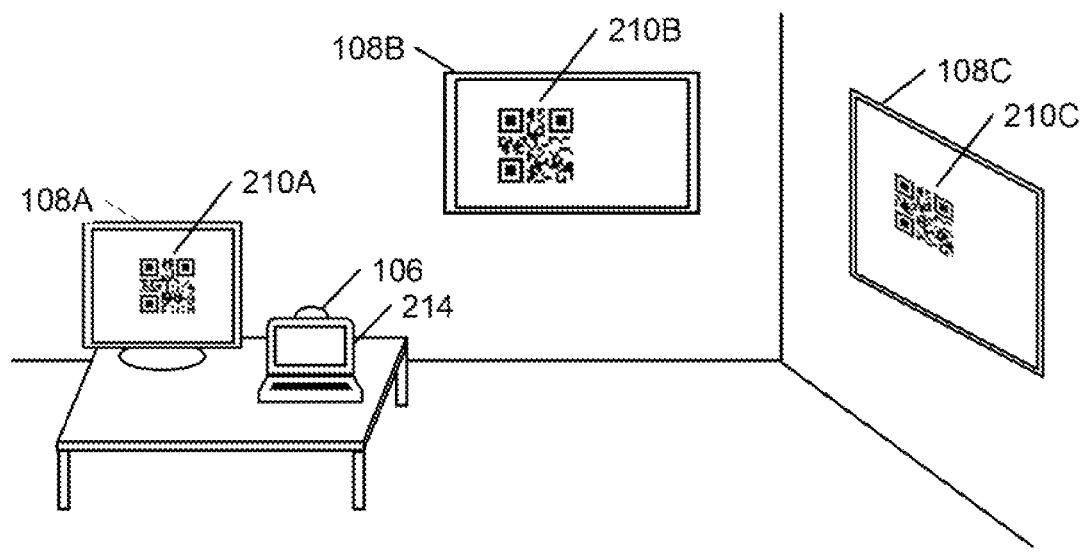
FIG. 2A illustrates a physical environment and the system for geospatial display configuration, according to another example.

FIG. 2A illustrates a physical environment and the system for geospatial display configuration, according to another example. The physical environment may be an environment where computing devices are used to present information. Examples of physical environment may include but are not limited to offices, educational institutions, and homes.

Within the physical environment may be more than one displays 108A, 108B, 108C. Each of the displays may be positioned within the physical environment in a manner appropriate for independent usage, however, in a multi-display system, the displays 108A, 108B, 108C, the positioning may be less than optimal. The displays 108A, 108B, 108C may be of different types. As illustrated in FIG. 2A display 108A is of a different type than display 108B and display 108C.

The processor 104, discussed in reference to FIG. 1, may be implemented in a laptop computing device 214. In some implementations, the processor 104 may be implemented as computing device 214 in a different form factor including but not limited to desktop computers, mobile phones, and tablets. The computing device 214 may include a camera 106. In some implementations, the camera 106 may be integrated to the computing device 214. In other implementations, the camera 106 may be implemented as a non-integrated device, connected to the computing device 214 by a communications interface such as universal serial bus.

The computing device 214 may be equipped with locational sensors such as global positioning system (GPS) receivers and accelerometers. The locational sensors may provide vector data relating to any motion of the computing device 214 during operation. The vector data may be transformed to be compatible with correlating motion within the three-dimensional model.

The displays 108A, 108B, 108C may display fiducial marks 210A, 210B, 210C that may identify each of them to the computing device 214. The fiducial marks 210A, 210B, 210C may be implemented as a machine-readable image. In this depiction of FIG. 2A, the fiducial marks 210A, 210B, 210C are illustrated as QR codes.

In one implementation, the camera 106, as a stand-alone device, may be rotated 360 degrees around the physical environment. Images of the camera 106 may be captured in series during the rotation. The precision of the three-dimensional space correlates directly to the number of images captured. The computing device 214 receives the images from the camera 106 and processes the images as described previously.

In another implementation, the camera 106 may be integrated into the computing device 214. The computing device 214 may be rotated 360 degrees around the room; capturing images in series during rotation. Likewise, the precision of the three-dimensional space correlates directly to the number of images captured.

During either implementation, the displays 108A, 108B, 108C, and their respective fiducial marks 210A, 210B, 210C may be captured within the series of images. As described above, in reference to FIG. 1 and again later in reference to FIG. 3, a three-dimensional space and model may be created to represent a geospatial relationship between the displays 108A, 1088, and 108C.

Figure 2B:
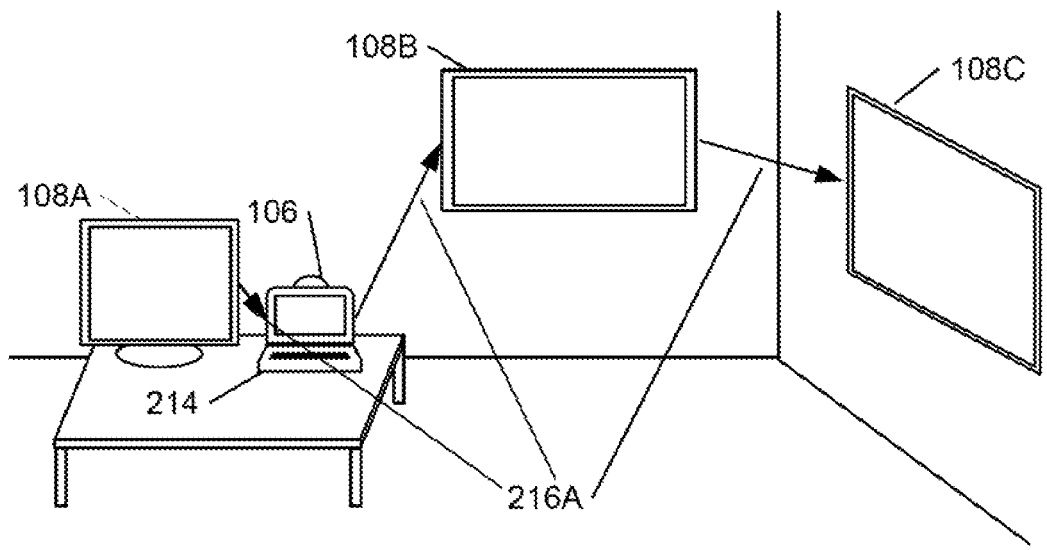
FIG. 2B illustrates a physical environment and the system for geospatial display configuration creating a pointing device mouse path, according to example.

FIG. 2B illustrates a physical environment and the system for geospatial display configuration creating a pointing device mouse path, according to another example. In FIG. 2B, the point device path 216A may be represented in relation to a physical environment after processing the series of images. In this implementation, the display configuration screen would represent the displays from left to right starting with display 108A, a display of the computing device 214, display 108B, and display 108C. The display configuration screen may extend a "desktop" across these displays. The pointing device path 216A, likewise would move virtually from display 108A, to the display of the computing device 214, to display 108B, and finally to display 108C.

Figure 2C:
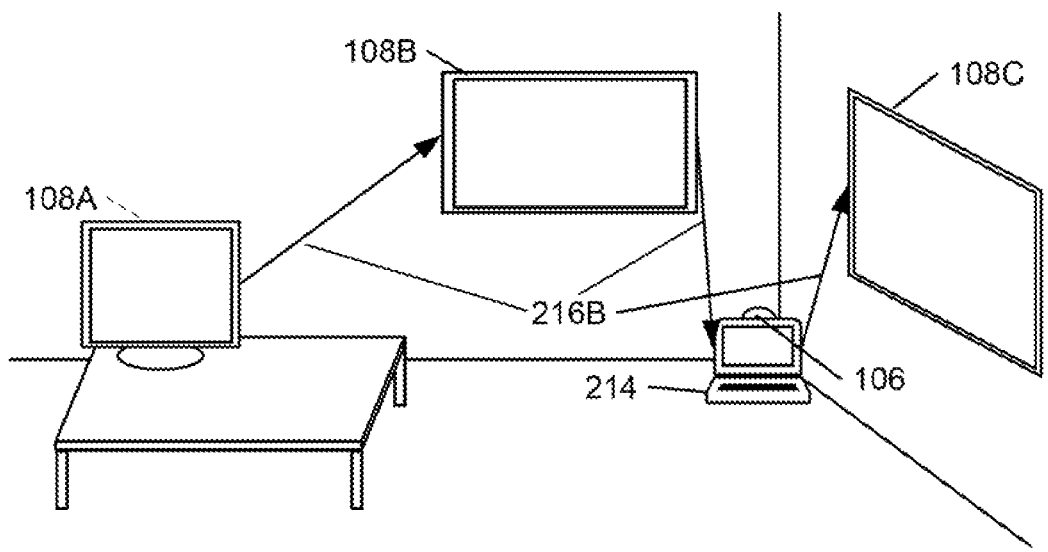
FIG. 2C illustrates a physical environment and the system for geospatial display configuration updating a pointing device mouse path, according to another example.

FIG. 2C illustrates a physical environment and the system for geospatial display configuration updating a pointing device mouse path, according to another example. In the event that the user moves the computing device 214 after the creation of the pointing device path 216A of FIG. 2B, the computing device 214 may update the path. In this implementation, the locational sensors of the computing device 214 may update the three-dimensional space and model corresponding to vector information received. For example, if the user moves the computing device to the right, in between displays 108B and display 108C, the integrated location sensor may detect that change and thereby update the three-dimensional model by applying a motion vector to the corresponding cartesian triplet corresponding to the location of the camera 106 or computing device 214.

As such, once the three-dimensional space and model are update, the display configuration screen may be updated and consequently, the pointing device path may be updated. In FIG. 2C, the pointing device path 216B has been updated from pointing device path 216A based on the movement of the computing device 214. In FIG. 2C, the pointing device path 216B originates at display 108A, then to display 108B, then to any integrated display of the computing device 214 and ending at display 108C.

Figure 3:
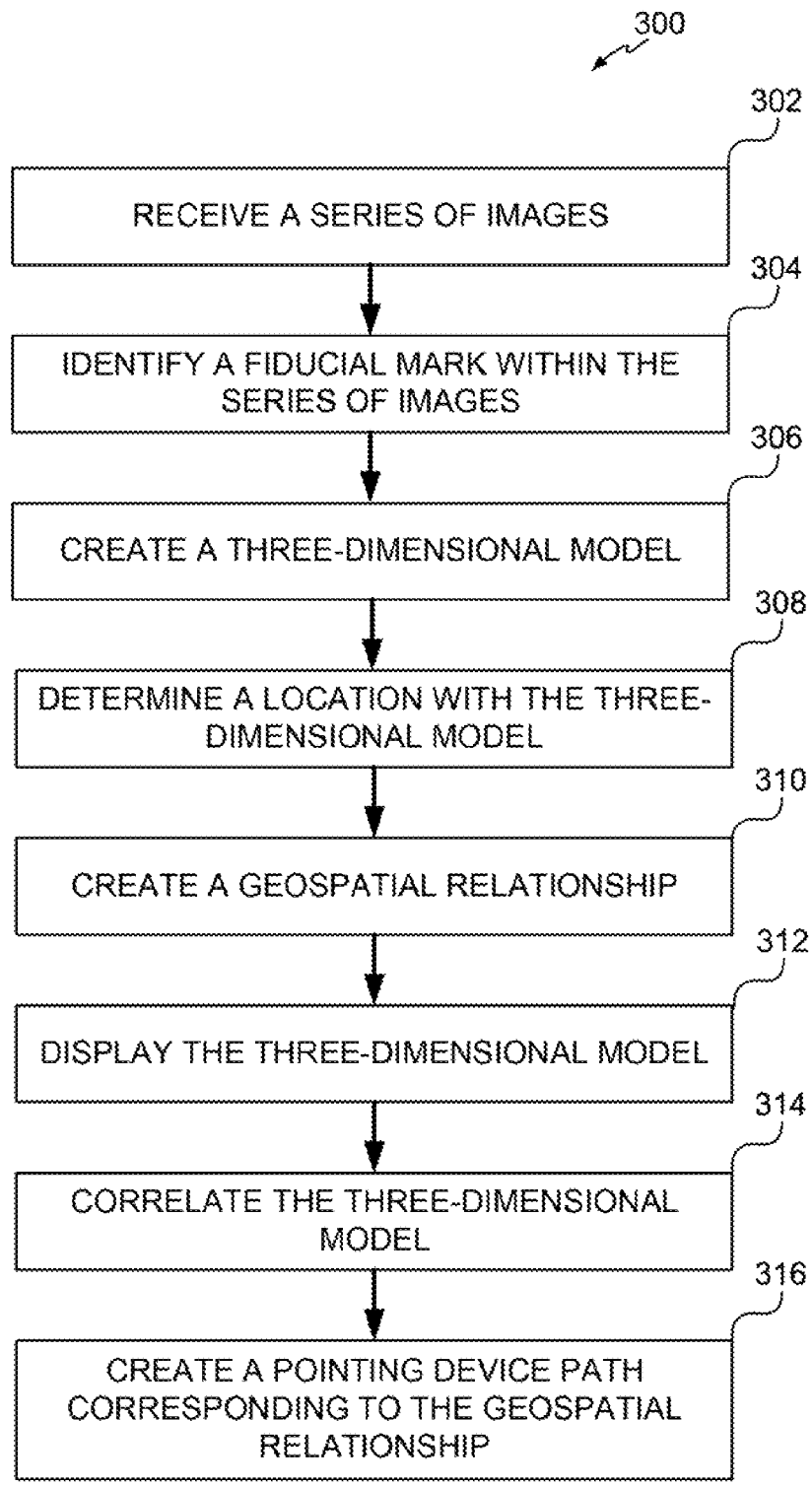
FIG. 3 is a flow diagram illustrating a method for geospatial display configuration, according to an example.

FIG. 3 is a flow diagram illustrating a method for geospatial display configuration, according to an example. In some implementations, the processor 104 of FIG. 1 may prepare the fiducial marks to be more identifiable in the series of captured images. When the processor 104 is integrated into a computing device 214, the processor 104 may have access to an ultrasonic system. The ultrasonic system may include both a speaker system and a microphone system and capable of transmitting and receiving ultrasonic sounds. The ultrasonic system may be integrated into the computing device 214. The ultrasonic system may be configured to directionally focus ultrasonic sounds at a corresponding camera target. In other words, the ultrasonic system directs ultrasonic sounds at whatever the camera is imaging.

At 302, the processor 104 receives a series of images from a camera, corresponding to a physical environment, wherein the series of images include a plurality of displays. The processor 104 may emit an ultrasonic signal from an ultrasonic system. The ultrasonic signal may be inaudible to most human auditory systems. The ultrasonic signal may be reflected from items within the view and capture of the camera. The processor 104 receives an ultrasonic echo wherein the ultrasonic echo corresponds to the ultrasonic signal. The ultrasonic echo reflects off the camera target as the ultrasonic system may be aligned with the camera. The processor 104 may calculate a distance based on a time difference between the emission of the ultrasonic signal and the receiving of the ultrasonic echo. Utilizing the timing and the known frequency at which the ultrasonic signal was emitted, the processor may determine the distance of the object from the computing device 214.

The processor 104 may update a size of the fiducial mark based on the distance. The processor 104 may scale the fiducial mark based on the ranging to provide a more distinct image. For example, if the distance is found to be far from the camera 106, the processor 104 may scale the fiducial marker larger to make the fiducial mark larger. This additionally allows a lower resolution camera to succeed in identifying fiducial marks on displays.

At 304, the processor 104 identifies a fiducial mark, scaled or unsealed, within the series of images wherein the fiducial mark uniquely identifies one of the plurality of displays. The fiducial mark may be processed by a number of image processing libraries available for processing fiducial marks such as bar codes (UPC) and QR codes.

At 306, the processor 104 creates a three-dimensional model based on a camera position based on the series of images. The three-dimensional model may be created utilizing photogrammetry as mentioned previously.

At 308, the processor 104 determines a location within the three-dimensional model corresponding to the one of the plurality of displays. Based on the three-dimensional model, the processor 104 may assign a location including a cartesian triplet, or more than one cartesian triplets to identify each corner of the display within the three-dimensional model. The photogrammetry may produce a precise location and scale of the display based on identifiable points between images in the series of images. In the event, that the processor 104 is unable to determine a location within the three-dimensional model, the processor may produce an alert to the user indicating that the processor was unable to determine a location within the three-dimensional model. The alert may be visual or audible to alert the user.

At 310, the processor 104 creates a geospatial relationship between the location and the camera within the three-dimensional model. The processor 104 may determine a delta between the cartesian triplets of the location of the display and the camera. The processor 104 may subtract one from the other to determine a direction in relation to another. For example, after subtraction of the cartesian triplets, the x value of the delta may be negative. In that case the display is to the left of the camera. In another example, the x value may be positive. In that case the display is to the right of the camera.

At 312, the processor 104 displays the three-dimensional model in a display configuration screen. To assist the user in better understanding the geospatial relationships determined between displays, the configuration screen may load the three-dimensional model, including the captured displays. The configuration screen display may be static with an isometric view or perspective view, or in another implementation, fully interactive with rotational controls as well as zoom functions.

At 314, the processor 104 correlates the geospatial relationship to the display configuration screen. Based on the created geospatial relationships, the processor 104 determines a display order for the display configuration. The processor 104 applies the geospatial relationships in the display configuration screen, by identifying each of the displays with human readable labels. In one implementation, the displays may be identified with numeric values so that the user may easily see the pointing device path.

At 316, the processor 104, creates a pointing device path in the display configuration screen corresponding to the geospatial relationship. The pointing device path may be a numeric representation of each of the displays in the display configuration screen. For example, the leftmost display in the display configuration screen may be visually identified with a "1" and as the pointing device path traverses each the displays, the visual identification is incremented by one per display. In another implementation, the pointing device path, may be a virtual line indicating direction, similar to what is illustrated in FIG. 2A.

After the creation of the pointing device path, the processor 104 receives a movement vector from an accelerometer. The movement vector may indicate speed and distance. The processor updates the geospatial relationship between the location and the camera within the three-dimensional model. The processor updates the three-dimensional model in the display configuration screen to reflect the updated geospatial relationship. The processor updates the pointing device path in the display configuration screen corresponding to the updated geospatial relationship.

Figure 4:
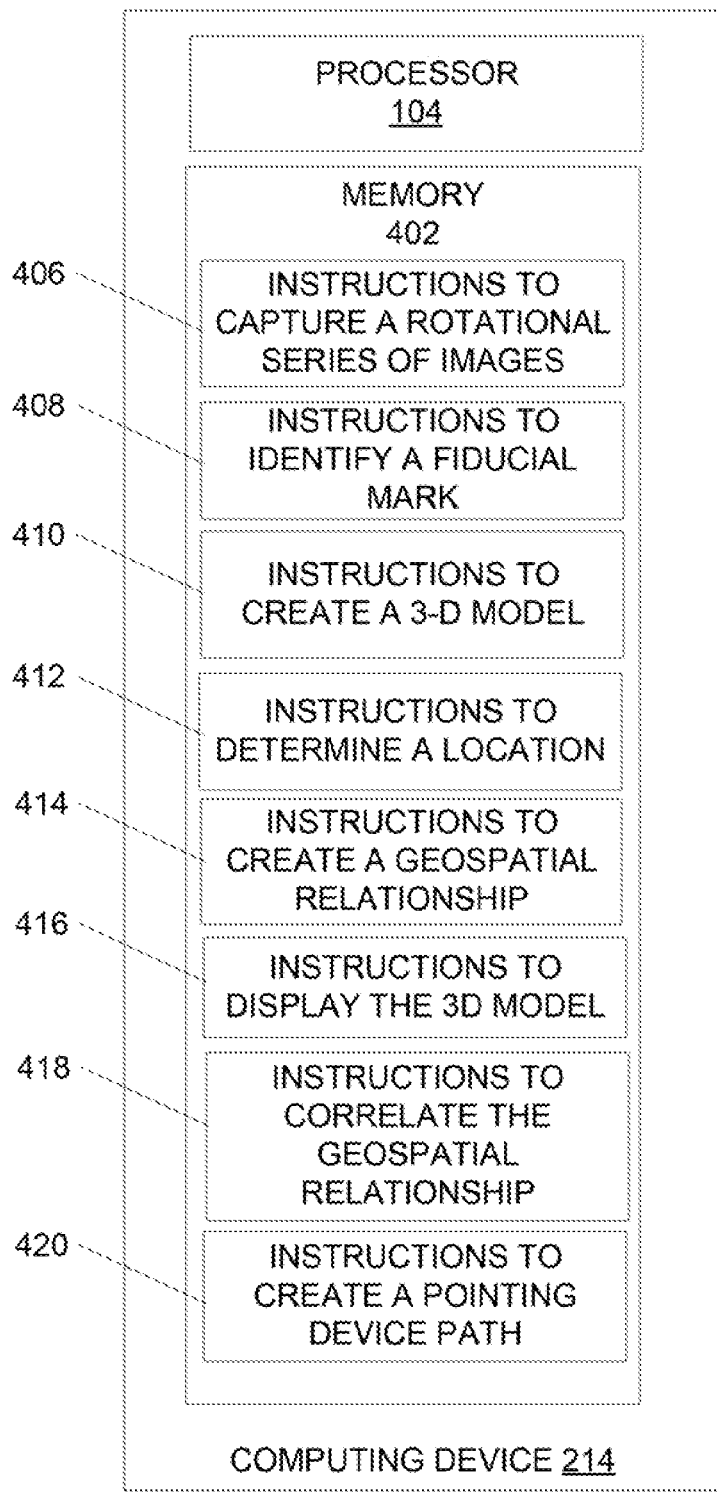
FIG. 4 is a computing device for geospatial display configuration, according to an example.

FIG. 4 is a computing device 214 for geospatial display configuration, according to an example. The computing device 214 depicts a processor 104 and a memory 402 and, as an example of the computing device 214 for geospatial display configuration, the memory 402 may include instructions 406-420 that are executable by the processor 104. The processor 104 may be synonymous with the embedded processors found in common computing environments including central processing units (CPUs). In another implementation the processor 104 may be an embedded microcontroller for processing inputs. The memory 402 can be said to store program instructions that, when executed by processor 104, implement the components of the computing device 214. The executable instructions may correspond to computer implemented instructions corresponding to the method of FIG. 3. The executable program instructions stored in the memory 402 include, as an example, instructions to capture a rotational series of images from a camera 406, instructions to identify a fiducial mark within the rotational series of images 408, instructions to create a three-dimensional model based on a camera position based on the rotational series of images 410, instructions to determine a location within the three-dimensional model corresponding to one of the plurality of displays 412, instructions to create a geospatial relationship between the location and the camera 414, instructions to display the three-dimensional model in a display configuration screen 416, instructions to correlate the geospatial relationship to the display configuration screen 418, and instructions to create a pointing device path in the display configuration screen 420.

Memory 402 represents generally any number of memory components capable of storing instructions that can be executed by processor 104. Memory 402 is non-transitory in the sense that it does not encompass a transitory signal but instead is made up of at least one memory component configured to store the relevant instructions. As a result, the memory 402 may be a non-transitory computer-readable storage medium. Memory 402 may be implemented in a single device or distributed across devices. Likewise, processor 104 represents any number of processors capable of executing instructions stored by memory 402. Processor 104 may be integrated in a single device or distributed across devices. Further, memory 402 may be fully or partially integrated in the same device as processor 104, or it may be separate but accessible to that device and processor 104.

In one example, the program instructions 406-420 can be part of an installation package that, when installed, can be executed by processor 104 to implement the components of the computing device 214. In this case, memory 402 may be a portable medium such as a CD, DVD, or flash drive, or a memory maintained by a server from which the installation package can be downloaded and installed. In another example, the program instructions may be part of an application or applications already installed. In another example, the memory 402 may be internal flash memory to an input device, wherein the program instructions 406-420 may be installed from the input device manufacturer. Here, memory 402 may include integrated memory such as a flash ROM, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
   a camera;
   a plurality of displays;
   a processor communicably connectable to the camera and the plurality of displays, the processor to:
      receive a series of images, from the camera, corresponding to a physical environment, wherein the series of images include images of the plurality of displays;
      identify a fiducial mark within the series of images corresponding to a one of the plurality of displays;
      determine a three-dimensional space based on a camera position based on the series of images;
      determine a location within the three-dimensional space corresponding to the one of the plurality of displays;
      create a geospatial relationship between the location and the camera within the three-dimensional space;
      correlate the geospatial relationship to a display configuration screen; and
      create a pointing device path in the display configuration screen corresponding to the geospatial relationship.

2. The system of claim 1 further comprising:
   an accelerometer; and
   the processor, wherein the processor is communicably connected to the accelerometer and further configured to:
      receive a movement vector from the accelerometer;
      update the geospatial relationship between the location and the camera within the three-dimensional space;
   update the display configuration screen to reflect the updated geospatial relationship; and
      update the pointing device path in the display configuration screen corresponding to the updated geospatial relationship.

3. The system of claim 2 further comprising:
   an ultrasonic system; and
   the processor, wherein the processor is communicably connected to the ultrasonic system and further configured to:
      emit an ultrasonic signal;
      receive an ultrasonic echo wherein the ultrasonic echo corresponds to the ultrasonic signal;
      calculate a distance based on a time difference between the emission of the ultrasonic signal and the receiving of the ultrasonic echo; and
      update a size of the fiducial mark based on the distance.

4. The system of claim 1 wherein the fiducial mark corresponds to a quick response (QR) code.

5. The system of claim 1 wherein the camera comprises an integrated laptop web camera.

6. A method comprising:
   receiving a series of images from a camera, corresponding to a physical environment, wherein the series of images include images of a plurality of displays;
   identifying a fiducial mark within the series of images wherein the fiducial mark uniquely identifies one of the plurality of displays;
   creating a three-dimensional model based on a camera position based on the series of images;

determining a location within the three-dimensional model corresponding to the one of the plurality of displays;

creating a geospatial relationship between the location and the camera within the three-dimensional model;

displaying the three-dimensional model in a display configuration screen;

correlating the geospatial relationship to the display configuration screen; and creating a pointing device path in the display configuration screen corresponding to the geospatial relationship.

7. The method of claim 6 further comprising:

receiving a movement vector from an accelerometer;

updating the geospatial relationship between the location and the camera within the three-dimensional model;

updating the three-dimensional model in the display configuration screen to reflect the updated geospatial relationship; and updating the pointing device path in the display configuration screen corresponding to the updated geospatial relationship.

8. The method of claim 7 further comprising:

emitting an ultrasonic signal from an ultrasonic system;

receiving an ultrasonic echo wherein the ultrasonic echo corresponds to the ultrasonic signal;

calculating a distance based on a time difference between the emission of the ultrasonic signal and the receiving of the ultrasonic echo; and updating a size of the fiducial mark based on the distance.

9. The method of claim 8 wherein the fiducial mark corresponds to a quick response (QR) code.

10. The method of claim 6 wherein the camera comprises an integrated laptop web camera.

11. A non-transitory machine-readable storage medium comprising instructions executable by a processor to:

capture a rotational series of images from a camera, corresponding to a physical environment, wherein the rotational series of images include images of a plurality of displays;

identify a fiducial mark within the rotational series of images wherein the fiducial mark uniquely identifies one of the plurality of displays;

create a three-dimensional model based on a camera position based on the rotational series of images;

determine a location within the three-dimensional model corresponding to the one of the plurality of displays;

create a geospatial relationship between the location and the camera within the three-dimensional model;

display the three-dimensional model in a display configuration screen;

correlate the geospatial relationship to the display configuration screen; and create a pointing device path in the display configuration screen corresponding to the geospatial relationship.

12. The machine-readable storage medium of claim 11 further comprising instructions executable by a processor to:

receive a movement vector from an accelerometer;

update the geospatial relationship between the location and the camera within the three-dimensional model;

update the display configuration screen to reflect the updated geospatial relationship; and update the pointing device path in the display configuration screen corresponding to the updated geospatial relationship.

13. The machine-readable storage medium of claim 12 further comprising instructions executable by a processor to:

emit an ultrasonic signal from an ultrasonic system wherein the ultrasonic system co-locates in a device with the camera;

receive an ultrasonic echo wherein the ultrasonic echo corresponds to the ultrasonic signal;

calculate a distance based on a time difference between the emission of the ultrasonic signal and the receiving of the ultrasonic echo; and update a size of the fiducial mark based on the distance.

14. The machine-readable storage medium of claim 11 wherein the fiducial mark corresponds to a quick response (QR) code.

15. The machine-readable storage medium of claim 11 wherein the camera comprises an integrated laptop web camera.

* * * * *